United States Patent
Shen et al.

(10) Patent No.: US 6,783,581 B2
(45) Date of Patent: Aug. 31, 2004

(54) INK-JET INK COMPRISING A GLYCOL COMPOUND WITH GRAFTS

(75) Inventors: Yu-Chang Shen, Taipei (TW); Chia-Hsin Chien, Taoyuan (TW); Yu-Ting Lin, Lujou (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/281,972

(22) Filed: Oct. 29, 2002

(65) Prior Publication Data

US 2003/0101906 A1 Jun. 5, 2003

(30) Foreign Application Priority Data

Oct. 30, 2001 (TW) .......................................... 90126957 A

(51) Int. Cl.$^7$ .............................................. C09D 11/02
(52) U.S. Cl. .................................. 106/31.86; 106/31.65
(58) Field of Search ............................ 106/31.86, 31.65

(56) References Cited

U.S. PATENT DOCUMENTS

| | | | | |
|---|---|---|---|---|
| 4,963,652 A | * | 10/1990 | Tortorici et al. ............ | 524/604 |
| 5,154,761 A | * | 10/1992 | Cooke et al. ............. | 106/31.58 |
| 5,980,622 A | * | 11/1999 | Byers ....................... | 106/31.48 |
| 5,985,016 A | * | 11/1999 | Tsang et al. .............. | 106/31.64 |
| 6,019,828 A | * | 2/2000 | Rehman ................... | 106/31.58 |
| 6,277,183 B1 | * | 8/2001 | Johnson et al. ........... | 106/31.27 |
| 6,613,136 B1 | * | 9/2003 | Arita et al. ............... | 106/31.58 |
| 2002/0083866 A1 | * | 7/2002 | Arita et al. ............... | 106/31.27 |
| 2002/0096085 A1 | * | 7/2002 | Gotoh et al. ............. | 106/31.86 |
| 2003/0010252 A1 | * | 1/2003 | Arita et al. ............... | 106/31.27 |

* cited by examiner

*Primary Examiner*—Mark L. Bell
*Assistant Examiner*—Veronica F. Faison
(74) *Attorney, Agent, or Firm*—Rabin & Berdo, PC

(57) ABSTRACT

An ink-jet ink comprising a glycol compound with grafts, an aqueous solution, a pigment as a colorant, a surfactant, and a humectant is disclosed. The ink-jet ink has low surface tension and high drying speed. Moreover, the ink-jet ink has high adhesive force between the ink drops and the printing medium, and thus provides the printing medium with high water fastness.

16 Claims, No Drawings

INK-JET INK COMPRISING A GLYCOL COMPOUND WITH GRAFTS

This application incorporates by reference of Taiwan application Serial No. 090126957, filed Oct. 30, 2001.

BACKGROUND OF THE INVENTION

1. Field of the Invention

The invention relates in general to a composition of an ink-jet ink, and more particularly to an ink-jet ink containing glycol compounds with grafts, for providing the printing media with high printing quality.

2. Description of the Related Art

The Ink-jet printing technology is well developed and has the advantages of low cost, low noise, and being capable of providing full-color prints with ease. Furthermore, a high-quality printed image can be produced not only on specialty recording media, but also on inexpensive plain papers and transparency films.

Ink-jet inks can be generally classified as dye inks or pigment inks by the colorants therein. Compared with pigment inks, dye inks have higher water solubility, and provide brighter colors but with inferior light fastness and water fastness. Two common additives for improving the water fastness of the dye inks are organic compounds and resin, which enhance the adhesive force between the colorant and printing medium. On the other hand, pigment inks provide less bright colors and tend to cause the clogging of the nozzle due to the large particle size. Thus, dispersing pigment inks are desired.

Freedom from feathering in the printed image is one of the key requirements of the ink-jet ink. Ink-jet inks with low cohesive force could result in feathering by the aid of the capillary of the paper. A surfactant is therefore usually added to adjust the surface tension and viscosity of the ink and to ensure the image quality.

Another key requirement of ink-jet inks is high drying speed. However, the ink-jet ink is hard to dry since it is usually water-based. Enhancing the penetration of the ink could result in high drying speed of the ink, and adding an agent with high volatility is an alternative method. However, ink added with high-volatility agents could form a crust over the tip of an ink-jet nozzle, which would stop the printer from working properly. In general, dye inks have higher penetration and dry within 1 second, and pigment inks have lower penetration and take longer than 10 seconds to dry.

In short, pigment inks have superior water fastness and light fastness, but are hard to dry. Thus, increasing the drying speed of pigment inks is an important issue.

SUMMARY OF THE INVENTION

It is therefore an object of the invention to provide an ink-jet ink, which has low surface tension and high drying speed. It is a further object of the invention to provide an ink-jet ink, which has high adhesive force between the ink drops and the printing medium, thus providing the printing medium with high water fastness.

The ink-jet ink of the invention comprises a medium, a colorant, and a glycol compound with grafts, wherein the colorant is a dispersing pigment, the medium further comprises an aqueous solution, and the glycol compound with grafts is water-soluble. The glycol compound with grafts can be one or any mixture of the following: 2-ethyl-1,3-hexanediol; 2,4-diethyl-1,5-pentanediol; 2-butyl-2-ethyl-1,3-propanediol; 2,2-dimethylpropane-1,3-diol; and 2,5-dimethylhexane-2,5-diol. The glycol compound with grafts in the ink-jet ink is about 0.01 wt % to 25 wt %, and the number of grafts of the glycol compound is between 4 and 20. The average particle size of the pigment is less than 1 $\mu$m. The medium could further comprise a surfactant, an organic solvent, a humectant, a pH buffer, and a biocide.

Other objects, features, and advantages of the invention will become apparent from the following detailed description of the preferred but non-limiting embodiments. The following description is made with reference to the accompanying drawings.

DETAILED DESCRIPTION OF THE INVENTION

The main components of the pigment ink-jet ink of the invention include a medium, a colorant, and a glycol compound with grafts, wherein the medium therein could comprise a solvent, a surfactant, and a humectant. The major ingredient of the solvent is water, and the water in the ink-jet ink of the invention has a weight percentage of about 50 wt % to 95 wt %, preferably in a range of about 70 wt % to 90 wt %. In addition to water, the medium further comprises a water-soluble organic solvent and a water-soluble inorganic salt to enhance the penetration and dispersion of the ink.

For the colorant in the pigment ink-jet ink of the invention, the particle size of the pigment less than 1 $\mu$m is preferred, since large pigment particles could cause precipitate and the consequential clogging at the nozzles. Moreover, the use of the dispersing agent and adhesion agent can further eliminate the blockage of the nozzles. The amount of the total pigment can be about 1%~15%, preferably about 1%~7%.

One or more surfactant(s) can be added to the medium to adjust the viscosity for a smooth ink supply and ink-jet and to adjust the surface tension of the ink to prevent feathering. Moreover, surfactants also enhance the penetration and dispersion of the ink. Surfactants applied in the inks of the invention can be anionic, nonionic, cationic, or amphoteric. The total amount of surfactants is usually less than 15 wt %.

Additionally, to prevent the clogging of the nozzles, humectants can be added to slow down the rate of ink evaporation. Humectants are usually water-soluble organic compounds with low volatility, such asethylene glycol, polyethylene glycol, and glycerol. The amount thereof is less than 20 wt %.

Also, other additives could be also included in the ink. One of the preferred additives is a biocide, which inhibits the growth of bacteria. Another preferred additive is a pH buffer, which keeps the ink in suitable pH value range to perform ideal colors. It is well known to persons skilled in the art that other additives, which enhance light fastness or stability in storage, could be also added in the ink of the invention.

The glycol compound with grafts added in the ink-jet ink of the invention could be any single one or mixture of the following: 2-ethyl-1,3-hexanediol; 2,4-diethyl-1,5-pentanediol; 2-butyl-2-ethyl-1,3-propanediol; 2,2-dimethylpropane-1,3-diol; and 2,5-dimethylhexane-2,5-diol. The chemical structures thereof are listed as follow.

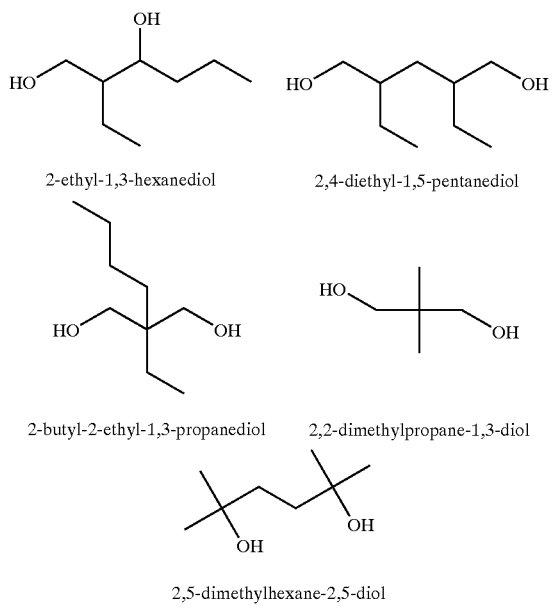

The above-shown glycol compounds are preferred additives of the ink-jet ink of the invention, but the scope of the invention is not limited thereto. One single glycol compound or mixture could be ideal for the ink-jet ink of the invention. The concentration of the total glycol compound(s) is partially determined by the solubility, and generally, the preferred concentration is about 0.01% to 25%.

With the adding of the glycol compounds with grafts, the surface tension of the ink-jet ink of the invention is effectively reduced, the speed of ink drying is therefore increased, and consequently the bleeding and feathering of the ink is prevented. The water fastness and rub fastness of the ink-jet ink of the invention is also improved due to the higher adhesive force between the ink drop and the media.

The effect and performance of the ink-jet ink with grafts are shown in Table 1. Ink-jet inks with various glycol compounds with grafts are taken for testing the speed of ink drying and water fastness. One of the ink-jet inks having no addition of glycol compounds with grafts acts as the control.

The ink drying test is done by covering a blank plain paper on the printed image immediately after the image is printed in order to absorb the ink. The more ink that is transferred to the plain test paper indicates a slower drying speed of the ink. The results are qualitatively differentiated as superior, good, and inferior.

The water fastness of the ink is tested by spraying a determined quantity of water on the printed image immediately after the image is printed. After a pre-determined period of time, the degree of feathering is observed. The results are qualitatively differentiated as good, and inferior.

TABLE 1

| Additive | Surface Tension (dyne/cm) | Printing Performance Speed of drying | Water Fastness |
|---|---|---|---|
| Nil | 58.7 | Inferior | Inferior |
| 2-ethyl-1,3-hexanediol | 38.7 | Good | Good |
| 2,4-diethyl-1,5-pentanediol | 40.2 | Good | Good |

TABLE 1-continued

| Additive | Surface Tension (dyne/cm) | Printing Performance Speed of drying | Water Fastness |
|---|---|---|---|
| 2-butyl-2-ethyl-1,3-propanediol | 37.9 | Superior | Good |
| 2,2-dimethylpropane-1,3-diol | 40.1 | Good | Good |
| 2,5-dimethylhexane-2,5-diol | 38.6 | Good | Good |
| 1 wt % of 2-butyl-2-ethyl-1,3-propanediol and 0.5 wt of 2,5-dimethylhexane-2,5-diol | 38.1 | Superior | Good |

By the results shown in Table 1, it is apparent that ink-jet ink with grafts has a high drying speed and good water fastness. This improvement is achieved by the adding glycol compounds with grafts, which reduce the surface tension of the ink-jet ink and thus result in the superior printing performance.

Two recipes of the ink-jet ink of the invention are taken as examples and are listed as follow.

EXAMPLE 1

| Ingredient | Chemical Compound | Concentration (%) |
|---|---|---|
| Dispersing Pigment | Cab-O-Jet 200 (from Cabot) | 7 |
| Humectant | 2-Pyrrolidone (from Adrich) | 6 |
| Organic Solvent | Ethylene Glycol mono-butyl ether (from Adrich) | 1.5 |
| Polymeric Organic Solvent | Polyethylene Glycol 900 (from Adrich) | 6 |
| Glycol Compound with Grafts | 2-ethyl-1,3-hexanediol | 2.5 |
| Biocide | Mergal K7 (from Clariant) | 0.5 |
| Solvent | De-ionized Water | 76.5 |

EXAMPLE 2

| Ingredient | Chemical Compound | Concentration (%) |
|---|---|---|
| Dispersing Pigment | Cab-O-Jet 200 (from Cabot) | 7 |
| Humectant | 2-Pyrrolidone (from Adrich) | 6 |
| Organic Solvent | Ethylene Glycol mono-butyl ether (from Adrich) | 1.5 |
| Polymeric Organic Solvent | Polyethylene Glycol 900 (from Adrich) | 6 |
| Glycol Compound with Grafts | 2,4-diethyl-1,5-pentanediol | 1 |
|  | 2-butyl-2-ethyl-1,3-propanediol | 1.5 |
| Biocide | Mergal K7 (from Clariant) | 0.5 |
| Solvent | De-ionized water | 76.5 |

The ink-jet inks shown in Example 1 and Example 2 are taken for the printing performance test. The results of the test show that both the ink-jet ink with a single glycol compound with grafts and their mixture will reduce the surface tension of the ink and increase the drying rate of the ink. Moreover, the adhesion between the ink drops and the printing medium is enhanced, and thus the water fastness thereof is increased.

To sum up, the ink-jet ink of the invention includes the following advantages:

1. Effectively reducing the surface tension of the ink composition and increasing the speed of drying; and 2. Enhancing the adhesive force between the ink drops and the printing medium, and thus enhancing the water fastness of the printing medium with printed features.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ink-jet ink composition, comprising:
   at least one colorant, wherein the colorant is a dispersing pigment;
   a medium comprising an aqueous solution; and
   at least one water-soluble glycol compound with grafts selected from the group consisting of 2,4-diethyl-1,5-pentanediol, 2-butyl-2-ethyl-1,3-propanediol, 2,2-dimethylpropane-1,3-diol and 2,5-dimethylhexane-2,5-diol.

2. The ink-jet ink composition as claimed in claim 1, wherein the glycol compound with grafts is present in a concentration from about 0.01 wt % to about 25 wt %.

3. The ink-jet ink composition as claimed in claim 1, wherein an average particle size of the dispersing pigment is less than 1 $\mu$m.

4. The ink-jet ink composition as claimed in claim 1, wherein the medium comprises a surfactant.

5. The ink-jet ink composition as claimed in claim 1, wherein the medium comprises an organic solvent.

6. The ink-jet ink composition as claimed in claim 1, wherein the medium comprises a humectant.

7. The ink-jet ink composition as claimed in claim 1, wherein the medium comprises a pH buffer.

8. The ink-jet ink composition as claimed in claim 1, wherein the medium comprises a biocide.

9. A method of ink-jet printing, comprising the steps of:
   providing an ink-jet ink composition, comprising:
      at least one colorant, wherein the colorant is a dispersing pigment;
      a medium comprising an aqueous solution;
      at least one water-soluble glycol compound with grafts selected from the group consisting of 2,4-diethyl-1,5-pentanediol, 2-butyl-2-ethyl-1,3-propanediol, 2,2-dimethylpropane-1,3-diol and 2,5-dimethylhexane-2,5-diol; and
   printing the ink-jet ink composition on a printing media by means of an ink-jet pen.

10. The method of claim 9, wherein the glycol compound with grafts is present in a concentration from about 0.01 wt % to about 25 wt %.

11. The method of claim 9, wherein an average particle size of the dispersing pigment is less than 1 $\mu$m.

12. The method of claim 9, wherein the medium comprises a surfactant.

13. The method of claim 9, wherein the medium comprises an organic solvent.

14. The method of claim 9, wherein the medium comprises a humectant.

15. The method of claim 9, wherein the medium comprises a pH buffer.

16. The method of claim 9, wherein the medium comprises a biocide.

* * * * *